(12) United States Patent
Rice et al.

(10) Patent No.: US 10,408,406 B1
(45) Date of Patent: Sep. 10, 2019

(54) PARTIALLY COATED VEHICLE HALOGEN LAMP CAPSULE FOR PROJECTOR HEADLIGHT

(71) Applicants: Lawrence M. Rice, Hillsboro, NH (US); Joseph C. Swadel, Hillsboro, NH (US)

(72) Inventors: Lawrence M. Rice, Hillsboro, NH (US); Joseph C. Swadel, Hillsboro, NH (US)

(73) Assignee: OSRAM SYLVANIA Inc., Wilmington, MA (US)

(*) Notice: Subject to any disclaimer, the term of this patent is extended or adjusted under 35 U.S.C. 154(b) by 0 days.

(21) Appl. No.: 16/150,470

(22) Filed: Oct. 3, 2018

(51) Int. Cl.
*B60Q 1/04* (2006.01)
*F21S 41/37* (2018.01)
*F21S 41/60* (2018.01)
*F21S 41/166* (2018.01)
*F21S 41/275* (2018.01)

(52) U.S. Cl.
CPC .............. *F21S 41/166* (2018.01); *B60Q 1/04* (2013.01); *F21S 41/275* (2018.01); *F21S 41/37* (2018.01); *F21S 41/60* (2018.01)

(58) Field of Classification Search
CPC ........ F21S 41/166; F21S 41/37; F21S 41/275; F21S 41/60; B60Q 1/04
See application file for complete search history.

(56) References Cited

U.S. PATENT DOCUMENTS

| 5,111,105 A | 5/1992 | Yamamoto |
| 5,660,462 A | 8/1997 | Bockley |
| 5,938,323 A | 8/1999 | McMahan |
| 6,093,999 A | 7/2000 | English |
| 6,281,630 B1 | 8/2001 | English |
| 6,369,510 B1 | 1/2002 | Shaw |
| 8,070,339 B2 | 12/2011 | Koike |
| 8,523,417 B2 | 9/2013 | Kobayashi |

(Continued)

FOREIGN PATENT DOCUMENTS

WO  2008/074657 A2  6/2015

OTHER PUBLICATIONS

Excerpt from Wördenweber, et al., "Automotive Lighting and Human Vision", ISBN 978-3-540-36696-6 (Springer Berlin, Heidelberg, New York, 2007) at Chap. 3.1, pp. 102-108 (9 pages).

(Continued)

*Primary Examiner* — Thomas M Sember
(74) *Attorney, Agent, or Firm* — Edward S. Podszus

(57) ABSTRACT

A partially coated lamp capsule (212) for a projection headlamp (12) has filament (224) in capsule envelope (220) having light-transmissive coating (60) extending from capsule upper region (225) towards filament distal end (227) to an axial location in a region defined between about 0.098 inch (2.5 mm) above filament distal end (227) and about 0.098 inch below filament distal end (227), the capsule envelope (220) being uncoated on an undistorted portion of capsule envelope (220) below filament proximal end (229). Lamp capsule (212) is useful in projection headlamp (12) having a reflector (28) whose central heel (37) forms the hot spot and casts light through projector lens (30) to generate low and/or high beam patterns. Present lamp capsules (212) give increased photometric intensity over conventional lamps in low beam at critical driver's lane (0.6D, 1.3R) and (0.86D, V) test points, and in high beam at the critical (H,V) test point.

31 Claims, 15 Drawing Sheets

(56) References Cited

U.S. PATENT DOCUMENTS

| | | |
|---|---|---|
| 8,894,257 B2 | 11/2014 | Rice |
| 8,905,609 B2 | 12/2014 | Tessnow |
| 9,068,710 B2 | 6/2015 | Lai |
| 9,150,144 B2 | 10/2015 | Abe |
| 9,396,925 B1 | 7/2016 | Rice et al. |
| 9,759,400 B2 | 9/2017 | Rice |
| 9,939,119 B2 | 4/2018 | Lessard |
| 10,066,801 B1 | 9/2018 | Rice et al. |
| 10,094,527 B1 | 10/2018 | Bushre |
| 2005/0047166 A1 | 3/2005 | Skirha |
| 2009/0052200 A1 | 2/2009 | Tessnow et al. |

OTHER PUBLICATIONS

"Federal Motor Vehicle Safety Standards; Lamps, Reflective Devices, and Associated Equipment; Final Rule", 49 CFR Parts 564 and 571 in Federal Register, vol. 72, No. 232, Dec. 4, 2007, pp. 68234-68439, with Table XIX-a appearing on p. 68329 (p. 97 of document, consisting of 207 pgs).

Excerpt of SAE (Society of Automotive Engineers) Tech. Spec. J2560, issued Jul. 2007 (pp. 41-56).

| DIMENSION | INCHES | MILLIMETERS |
|---|---|---|
| GA | 0.591 MAX/0.217 MIN | 15.00 MAX/5.50 MIN |
| GB | 0.236 | 6.00 |
| GC | 45 DEG | 45 DEG |
| GD | 0.079 | 2.00 |
| GE | 1.09 | 27.8 |
| GF | 0.165 | 4.20 |
| GG | 0.346 | 8.80 |
| GH | 0.433 | 11.00 |
| GI | 0.053 | 1.40 |
| GJ | 0.217 ± 0.006 | 5.50 ± 0.15 |
| GK | 0.06 | 1.5 |
| GL | 0.775 DIAMETER | 19.68 DIAMETER |
| GM | 2.165 | 55.00 |
| GN | 0.093 | 2.36 |
| GO | 0.157 | 4.00 |
| GP | 45 DEG CHAMFER | 45 DEG CHAMFER |
| GQ | 0.039 | 1.00 |
| GR | 0.797 ± 0.002 DIAMETER | 20.00 ± 0.05 DIAMETER |
| GS | 0.138 | 3.50 |
| GT | 0.687 +0.004/-0.000 DIAMETER | 17.46 +0.10/-0.000 DIAMETER |
| GU | 0.079 | 2.00 |
| GV | 0.138 | 3.5 |
| GW | 0.209 MIN | 5.30 MIN |
| GX | 0.378 | 9.60 |

 DIMENSIONS SHOWN ARE MAXIMUM-MAY BE SMALLER

 BULBS MUST BE EQUIPPED WITH A SEAL. THE BULB-SEAL ASSEMBLY MUST WITHSTAND A MINIMUM OF 70 KPA (10psig) WHEN THE ASSEMBLY IS INSERTED INTO A CYLINDRICAL APERTURE OF 20.22 ± 0.10 mm (0.796 ± 0.004 IN)

 SEE FIG 18

 DIAMETERS MUST BE CONCENTRIC WITHIN 0.20 mm (0.008 in)

 GLASS BULB PERIPHERY MUST BE OPTICALLY DISTORTION FREE AXIALLY WITHIN THE INCLUDED ANGLES ABOUT POINT B

 KEY AND KEYWAY ARE OPTIONAL CONSTRUCTION. KEYWAY REQUIRED FOR AFTERMARKET ONLY.

 MEASURED AT THE TERMINAL BASE. TERMINALS MUST BE PERPENDICULAR TO THE BASE AND PARALLEL WITHIN ± 1.5 DEG

 DIAMETERS MUST BE CONCENTRIC WITHIN 0.20 mm (0.008 in)

 ABSOLUTE DIMENSION. NO TOLERANCE

 GLASS CAPSULE AND SUPPORTS SHALL NOT EXCEED THIS ENVELOPE AND SHALL NOT INTERFERE WITH INSERTION PAST THE LAMPS KEY.

 THE REFERENCE PLANE IS DETERMINED BY THREE (3) SUPPORTING BOSSES OF OPTIONAL SCHEMES OR A CONTINUOUS SURFACE.

| TOLERANCES UNLESS OTHERWISE SPECIFIED ||
|---|---|
| INCHES | MILLIMETERS |
| 2 PLACE DECIMALS ± 0.02 | 1 PLACE DECIMALS ± 0.05 |
| 3 PLACE DECIMALS ± 0.010 | 2 PLACE DECIMALS ± 0.030 |
| ANGULAR ± 1 DEG | ANGULAR ± 1 DEG |

PRIOR ART

FIG. 12B

PARTIALLY COATED VEHICLE HALOGEN LAMP CAPSULE FOR PROJECTOR HEADLIGHT

STATEMENT REGARDING FEDERALLY SPONSORED RESEARCH OR DEVELOPMENT

N/A

TECHNICAL FIELD

The present application relates to automotive headlamps and more particularly to a partially coated halogen lamp capsule for a projector headlamp having improved performance at critical test points in the low beam and high beam patterns.

BACKGROUND

Lighting systems (such as headlights) are well-known and are used in a wide variety of applications, including automotive applications. In general, a lighting system includes an apparatus for emitting one or more distinct light patterns. For example, a lighting system may emit light in a low-beam pattern/mode in which light is generally emitted below the horizon. The lighting system may also emit light in a high beam pattern/mode in which light is generally emitted above and below the horizon.

Recent headlamp performance testing procedures, in particular photometric output requirements, make it difficult for manufactures to comply. Non-exhaustive examples of applicable regulations/testing procedures are described by the United States National Highway Traffic Safety Administration (NHTSA) (e.g., at pages 96-99 and Tables XVIII, XIX-a of the Department of Transportation (DOT) 49 C.F.R. Parts 564 and 571 (which correspond to Vol. 72, No. 232 (Dec. 4, 2009) pages 68328-68331 of the Federal Register), hereinafter referred to as the NHTSA standard). In general, the requirements and/or testing procedures specify sharper gradient cutoffs, wider spreads, and reduced glare to oncoming traffic.

One conventional way to produce a headlamp beam is a reflection system in which the light of the source bulb is distributed by the shape of the reflector and use of a shading cup placed in front of the bulb to prevent uncontrolled direct beam being emitted by the bulb. In reflection systems, a clear cover lens, which is otherwise optically insignificant, is mounted forward of a reflector to prevent moisture or dirt from reaching the bulb or reflector. The reflector is smooth, segmented, or faceted; the beam distribution is exclusively produced by the reflector geometry and the shading cap.

Another, qualitatively different other way to produce a sharp gradient cutoff is through the use of a "projector" or "projection" type headlamp. The light from the bulb source is first focused by a nearly elliptical reflector in the focal plane of the lens. Projector headlamp designs involve light from the reflector passing by a shutter (also referred to as shade or shield) that blocks or subtracts light out of the pattern to produce a sharp gradient cutoff before passing the light to a projector lens. A shutter, when present, generates a low beam pattern. Some shutters are fixed (non-movable); other shutters are movable between two positions that change the pattern from low beam to high beam by removing the blocking effect of the shutter. Examples of shutters in projector headlamps are seen in Pat. Pub. US 2009/0052200 (Tessnow) and U.S. Pat. No. 8,070,339 (Koike) at FIG. 7 therein described as prior art. Examples of other headlamps are shown in U.S. Pat. No. 9,150,144 (Abe); U.S. Pat. No. 9,068,710 (Lai); and U.S. Pat. No. 8,523,417 (Kobayashi).

ACKNOWLEDGED PRIOR ART

A variety of lamps are known which are used with a reflection system headlamp, these are shown in U.S. Pat. No. 6,369,510 (Shaw); U.S. Pat. No. 9,396,925 (Rice) therein at FIG. 1 see the "Nightbreaker" lamp as well as the lamp of FIGS. 5-7 that is subject of Pat. '925; PCT WO 2008/074657 (Luennemann); and the "Silverstar Ultra" lamp, discussed infra.

Tungsten halogen automotive lamps having a bluish coating to shift the color temperature of the light produced to a whiter, higher color temperature are known, such as in U.S. Pat. No. 6,369,510 (Shaw). As described in U.S. Pat. No. 9,396,925 (Rice) by one of the co-inventors herein, a commercial embodiment of a lamp depicted in the Shaw Pat. '510 is sold in the United States by Osram Sylvania Inc. (OSI) under the trade designation "Silverstar" in which the capsule's entire light-emitting region (disregarding the upper dome, which is opaque, for glare control) has a bluish coating. The bluish coating is an absorption coating on the glass outer envelope that absorbs light at a peak of around 600 nm (the yellow-red region), and although the transmission of the bulb still results in a continuous output spectrum, it has a lower "yellow" content than uncoated halogen sources, see FIG. 6 of Shaw Pat. '510. Because the entire capsule is coated, the entire beam distribution has a color temperature of about 3800° K (in comparison, an uncoated, standard 9006-type halogen capsule produces that beam distribution with a lower color temperature of about 3050° K).

As summarized in U.S. Pat. No. 9,396,925 (Rice) at column 1, lines 39-59, a whiter beam color is perceived stylistically as aesthetically pleasing and can approximate the appearance of more expensive HID (High Intensity Discharge) lamps. The higher color temperature beam has the functional advantage of improved color contrast to aid obstacle detection and road surface orientation. The higher color temperature beam has the further functional advantage of higher effective intensity in peripheral vision, where the retina of the eye has proportionately more photoreceptors of the type that are rods than the type that are cones. Rods are more sensitive to blue light than the cones which are in the retina's central fovea region and are predominantly found in central vision. Higher color temperature light could, in theory, have an advantage in maintaining operator alertness at night.

Also known is PCT WO 2008/074657 (Leunnemann). A tinted vehicle lamp similar to that depicted in FIG. 2 of the PCT WO 2008/074657 has been marketed by Osram Sylvania Inc. in the United States under the designation "Night Breaker". This lamp also uses a coating of the type in Shaw Pat. '510 which absorbs more yellow, red and green wavelength light than it does blue and violet light. The "Night Breaker" lamp is shown in U.S. Pat. No. 9,396,925 (Rice) therein at FIGS. 1 and 2. The uncoated part of the lamp illuminates the hot spot part of the optics in the headlight, producing yellower light for the hot spot without intensity loss from having passed through the coating. A portion of the spread optics is illuminated by light which has first passed through the blue coated part of the lamp. However, there is still a large proportion of spread optics beam which receives light which does not pass through the blue coating.

As shown in U.S. Pat. No. 9,396,925 (Rice) at FIG. 1, the "Night Breaker" lamp capsule with axial filament has a non-light-transmissive (i.e., opaque) dome 50, for example black paint, at its top and the two coated bluish regions are indicated in cross-hatching. There is an uninterrupted, uncoated band-like region that separates the two coated regions, the uncoated region extending around the entire capsule. The capsule diameter is 12.06 mm, and the uncoated circumferential band is 5.5 mm+/−1 as measured along the axial direction. On the upper region of the capsule, the bluish coating is uniform and comes down to just above, or to the edge of, the upper edge of the filament coil. The uncoated band, of nominal height 5.5 mm, is centered on the light center length (LCL) of the filament. A coating can be provided on the press seal 40 for manufacturing convenience but that is not optically relevant since the press seal becomes held inside the base connector coupling it to the reflector. As shown in Rice Pat. '925 at FIG. 2, the spacing of the upper edge of the lower region of coating from the filament is such that light emitted from the capsule in a direction toward the capsule base passes through the uncoated widow along a conical envelope directed toward the capsule base and subtended by an angle, referred to as an extent angle, of about 130 to 137 degrees centered on the filament. Similarly, light extends along a similar conical envelope directed forward (direction of dome 50), but that is not light that is managed by the reflector.

Also known is U.S. Pat. No. 9,396,925 (Rice) which at FIGS. 5-7 depicts a lamp capsule used with a reflection system headlamp. Referring to FIGS. 5-7 and 10 and column 7, ln 7-26 therein, the uncoated part of the lamp illuminates the hot spot part of the optics in the headlight, producing yellower light for the hot spot without intensity loss from passing through the coating (indicated in FIG. 10 therein by double-cross hatched split dumbbell shaped area 105). The spread optics are illuminated by light which strikes the portion of the lamp with the bluish coating (indicated in FIG. 10 therein by single-hatched region 108).

As generally shown in prior art FIG. 11 herein, the "Silverstar Ultra" (abbreviated "SU") lamp capsule 450, which has been marketed under that trade designation by Osram Sylvania Inc. in the United States, has an axial filament and a non-light transmissive (opaque) dome 500, for example gold paint, at its top and two coated light-transmissive bluish regions as indicated in shading. The coating regions are located above and below the clear window; the clear window does not extend below the bottom end of the filament and has an axial extent the same as, or slightly longer than, the filament length. The bluish coating is an absorption coating, which acts as a color filter through which light is emitted with a color change. The uninterrupted, uncoated band-like window, which separates the two coated regions, extends around the entire capsule. The two respective coated regions each also extend circumferentially around the capsule envelope, uninterrupted, i.e., uniform. The uncoated circumferential band is 3.5 mm±1 (0.14 inch±0.04 in.) as measured along the axial direction. The uncoated band, of nominal height 3.5 mm, is centered on the light center length (LCL) of the filament. FIG. 11 shows that on the Silverstar Ultra (SU) capsule at the capsule upper region the coating is on the bulb envelope in a band that extends down between the opaque dome and a region slightly above the upper edge of the filament, and at the capsule base the coating extends up to the lower edge of the coil. A coating can be provided on the flattened press seal 400 for manufacturing convenience but that is not optically relevant since the press seal becomes held inside the base connector coupling it to the reflector. The prior art SU lamp is of the type designed as an SAE 9005 or 9006 bulb. In an SU capsule version (not shown) marketed and sold as a functional equivalent of the SU lamp shown in FIG. 11, there are similar upper and lower coating regions that surround a clear window, the clear window having an axial extent identical to the filament length, the coating at the upper region is on the bulb envelope in a band having a nominal width, with tolerance+0.060/−0.020 inch axially, extending from the dome to the upper edge of the coil.

Also known intended for use in reflection system headlamps are U.S. Pat. No. 6,093,999 (English); U.S. Pat. No. 6,281,630 (English); U.S. Pat. No. 5,660,462 (Bockley); and U.S. Pat. No. 5,111,105 (Yamamoto).

BRIEF DESCRIPTION OF THE DRAWINGS

Reference should be made to the following detailed description which should be read in conjunction with the following figures, wherein like numerals represent like parts:

FIGS. 12A and 12B is an excerpt from the Prior Art document SAE (Society of Automotive Engineers) J2560 Issued July 2007.

DETAILED DESCRIPTION INCLUDING BEST MODE OF A PREFERRED EMBODIMENT

Applicants herein appreciated that if lamp capsules of the type known as the 9005 Sylvania Silverstar Ultra (450, FIG.

Figure 1:
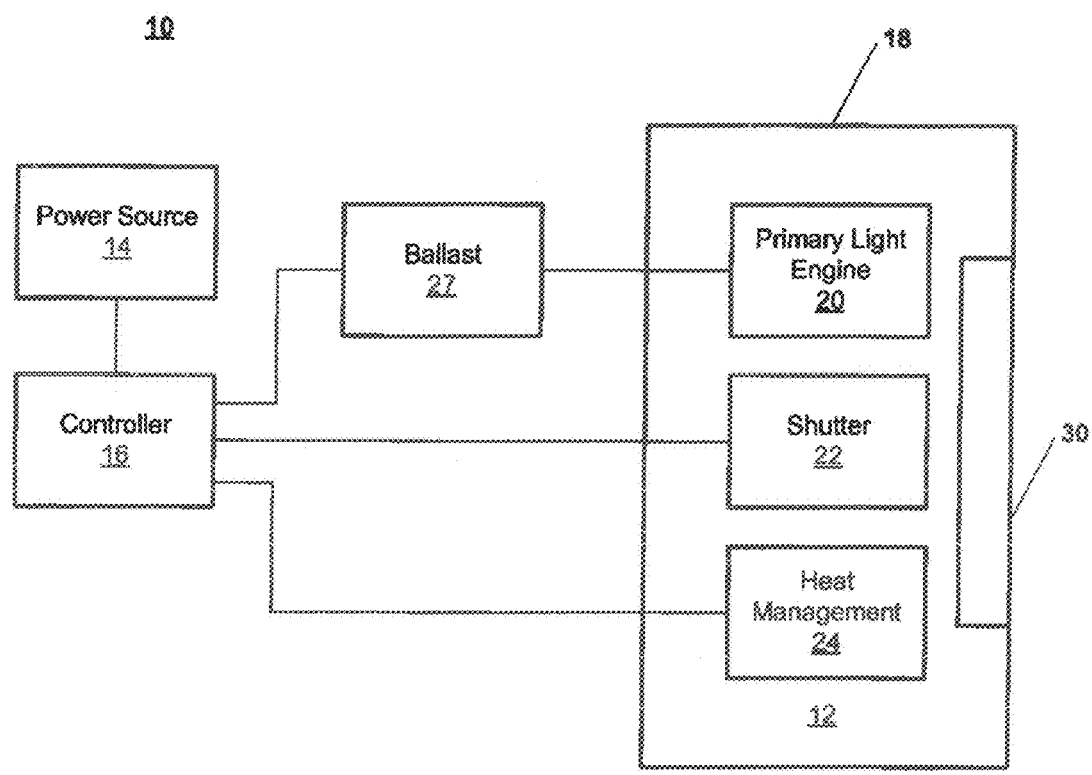
FIG. 1 diagrammatically illustrates a lighting system consistent with at least one embodiment of the present disclosure.

11); the Sylvania Nightbreaker (shown at FIG. 1 in Rice U.S. Pat. No. 9,396,925); or that shown in Rice U.S. Pat. No. 9,396,925 at FIGS. 5-7; or Luennemann PCT WO 2008/074657 ("Luennemann"); or Yamamoto U.S. Pat. No. 5,111,105 ("Yamamoto"), which are each designed for reflector-type headlamp systems, were inserted into a conventional projection-type headlamp system, the coatings on those lamp capsules (if they could even produce a street-legal beam satisfying NHTSA standards) would be detrimental to performance, due to the manner in which the central, rear region of the ellipsoidal projection-type reflector forms the hot spot.

Lamp embodiments of the present disclosure perform well in projector type headlamps in both low beam and high beam mode. Conventional lamps often struggle to pass the 40,000 candela minimum photometry value at the high beam (H,V) test point, discussed below, but present embodiments offer increased margin over this threshold by passing relatively more unfiltered light through uncoated capsule regions to the hot-spot forming region of the projection-type reflector. Furthermore, these present embodiments of lamp capsules when used in a projector headlamp low beam also offer increased photometric intensity at the critical test points (0.6 D, 1.3 R) and (0.86 D, V), discussed hereinbelow.

The following automotive lamps are known in patents of the Assignee of the present application and are hereby incorporated in their entirely as if fully set forth herein: U.S. Pat. No. 9,396,925 (Rice et al.), which shows a coated tungsten-halogen lamp; also U.S. Pat. No. 10,066,801 (Rice); U.S. Pat. No. 9,939,119 (Lessard), and U.S. Pat. No. 6,369,510 (Shaw). Projection lamp systems are known in patents or patent applications of the Assignee of the present application and are hereby incorporated in their entirely as if fully set forth herein: U.S. Pat. No. 8,905,609 (Tessnow) and U.S. Ser. No. 15/711,664 filed Sep. 21, 2017 grant date Oct. 9, 2018 as U.S. Pat. No. 10,094,527 (Bushre).

Projection Lighting Apparatus

In general, embodiments of the present disclosure are useful with a vehicle projector apparatus. The projector apparatus may be useful as an automotive headlight, tail light, and/or signal light, a marine light, an aircraft light, a recreational vehicle light, or other application for which two or more light distribution patterns are desired. The projector apparatus includes a reflector configured to reflect visible light emitted from a primary light engine, a projector lens configured to project at least a portion of the reflected visible light from the reflector, and a shutter disposed between the primary light engine and the projector lens, the shutter being generally opaque. The shutter can be fixed (e.g., non-movable) or movable (e.g., movable between a first and at least a second position). The shutter defines an upper edge, which defines a cut-off edge in the projected beam, configured to selectively obscure a portion of the projector lens from the reflected visible light and is configured to selectively emit at least a portion of the reflected visible light through at least a portion of the projector lens in a first light distribution pattern when disposed in the first position.

Turning now to FIG. 1, one embodiment of a lighting system 10 consistent with the present disclosure is generally illustrated. The lighting system 10 may comprise at least one projector apparatus 12, a power source 14, and a controller 16. The projector apparatus 12 may comprise a housing 18, a primary light engine 20, a shutter 22, and optionally heat management 24. The housing 18 may be configured to receive at least a portion of the primary light engine 20 and/or the shutter 22. The housing 18 may also include one or more lenses 30, such as reflector and/or projector lens as discussed herein. Shutter 22 is also referred to in the art as a shade or shield.

The projector apparatus 12 may receive an electrical input from the power source 14, for example, to energize the primary light engine 20 and/or the shutter 22. The power source 14 may comprise a DC and/or AC power source, and may optionally include one or more inverters, converters, and/or power conditioners. Optionally, one or more ballast circuits 27 may receive an electrical input from the power source 14 and convert it to a stable output for driving the projector apparatus 12. One or more of the ballast circuits 27 may be positioned remotely from the projector apparatus 12 or may be integral with or coupled directly to the housing 18 of the projector apparatus 12.

The controller 16 may transmit one or more signals to control the operation of the lighting system 10. For example, the controller 16 may transmit a signal to the power source 14 in order to selectively energize the primary light engine 20. The controller 16 may also transmit a signal to the shutter 22 to selectively control the position of the shutter 22 as discussed herein.

Figure 2:
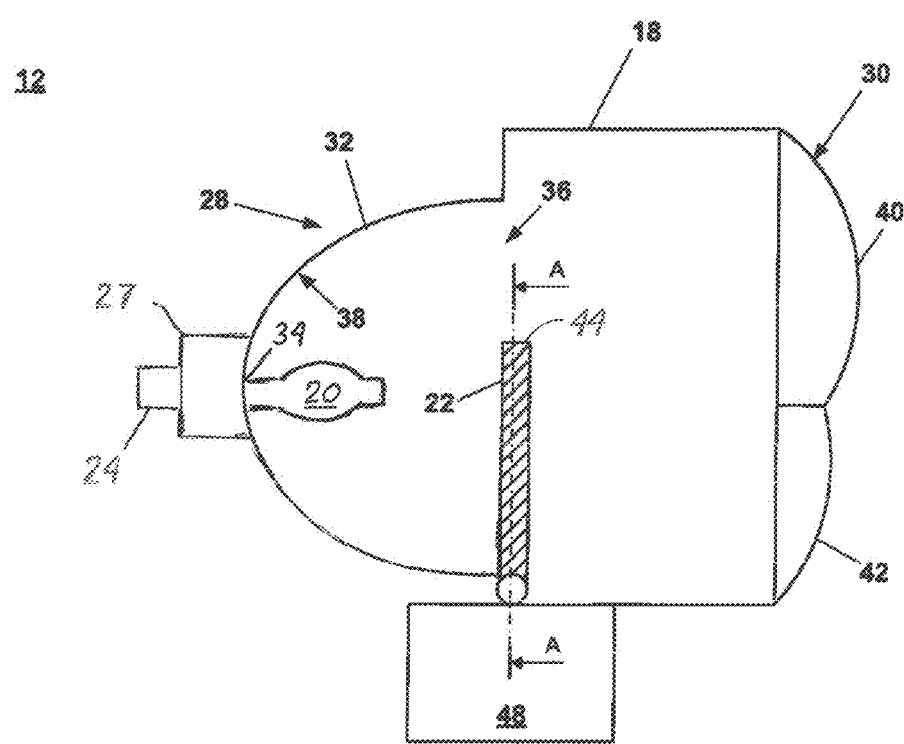
FIG. 2 is a side cross-sectional view diagrammatically illustrating an embodiment of the projector apparatus of FIG. 1.
Figure 3:
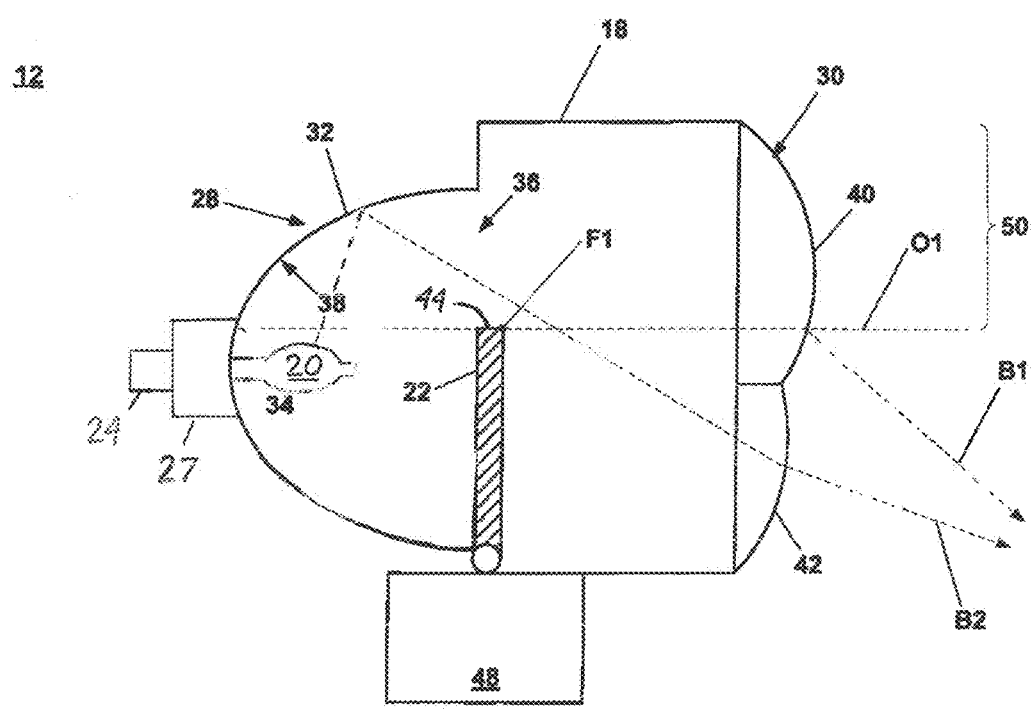
FIG. 3 is another side cross-sectional view diagrammatically illustrating an embodiment of the projector apparatus of FIG. 2 in a low beam mode.
Figure 4:
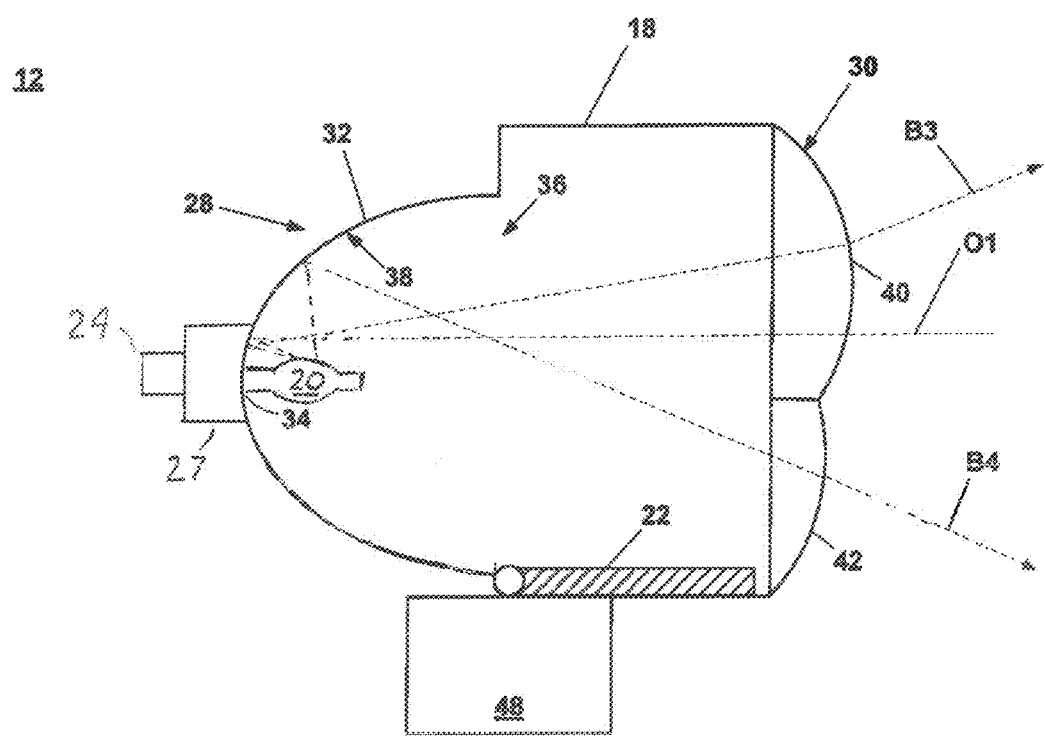
FIG. 4 is another side cross-sectional view diagrammatically illustrating an embodiment of the projector apparatus of FIG. 2 in a high beam mode.

Turning now to FIGS. 2-4, a cross-sectional view of one embodiment of the projector apparatus 12 is generally illustrated. As can be seen, the projector apparatus 12 may comprise the primary light engine 20, at least one reflector 28, at least one projector lens 30, and the shutter 22 which is moveable between at least a first position (as generally illustrated in FIGS. 2 and 3) and a second position (as generally illustrated in FIG. 4).

With reference to FIG. 2, the reflector 28 may be configured to receive light in the visible spectrum generated from the primary light engine 20. For example, the reflector 28 may include a reflector cup 32 including a mounting surface 34 configured to be secured to the primary light engine 20; an open end 36 from which light emitted by the primary light engine 20 may be cast from the projector apparatus 12; and an interior surface 38 configured to reflect light from the primary light engine 20 toward the open end 36. The phrase "reflector cup" thus includes, but is not limited to known parabolic, elliptical, poly-ellipsoidal ("PES") and sphero-elliptical reflector configurations including those with faceted interior surfaces as well as truncated reflector cups. The phrase "truncated reflector cup" means a portion of a reflector cup, as may be realized, for example, by dividing a reflector cup along a plane intersecting the longitudinal axis (e.g., intersecting a first end and a second end). A truncated reflector cup may thus be configured as one-half of a reflector cup, but may be more or less than half of a reflector cup. For example, a truncated reflector cup may have a semi-paraboloid or semi-elipsoid shape. As is known in a projection type headlamp, the shape of reflector 28 and reflector cup 32, often referred to as an ellipsoidal shape, is such that the light from light engine 20 is reflected towards a region forward of light engine 20 to a single focal point, where the light intersects shutter 22.

Figure 6:
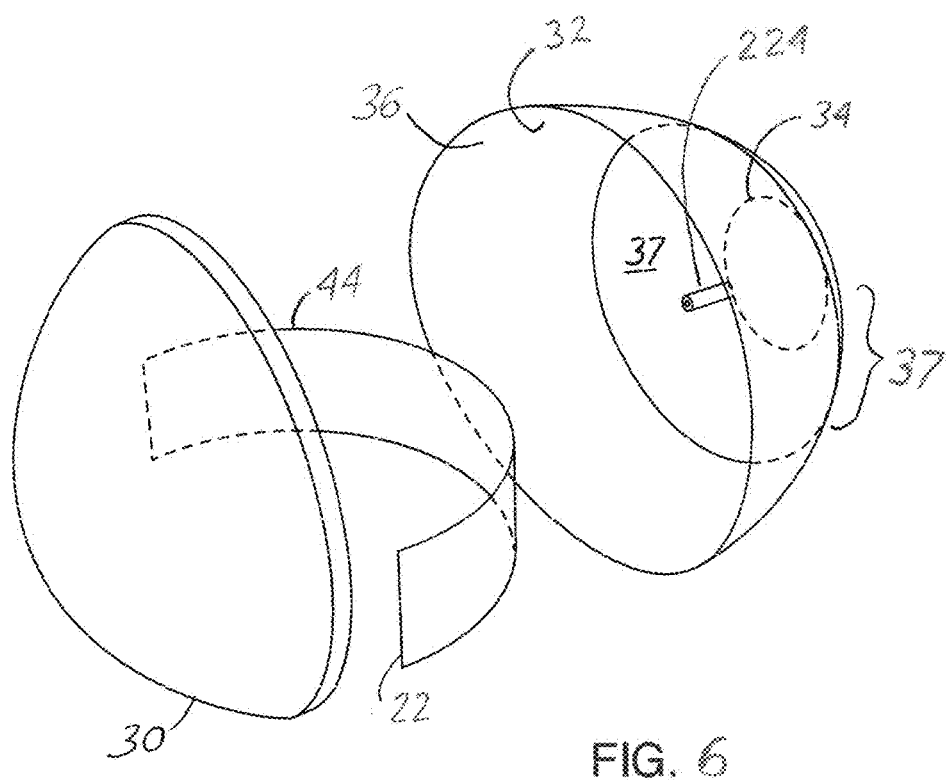
FIG. 6 is a perspective view diagrammatically illustrating the projector lamp of FIG. 2 showing hot-spot generating central heel region 37 of projector cup 32.

With reference to FIG. 6, in a projection headlamp system, the area of reflector 28 that is used to generate the hot spot in the projected beam is different from that in a conventional reflection system; in particular it is heel region 37 at a central, rearward portion or base of reflector cup 32 (indicated as a band above mounting surface 34), depicted generally schematically in FIG. 4, that generates the hot spot.

Projector lens 30 may be configured to emit light, generated from the primary light engine 20, in one or more distribution patterns. For example, projector lens 30 may be configured to distribute light in a first distribution pattern (e.g., FIG. 3) in which the light is emitted from projection apparatus 10 substantially at and/or below the horizon. The projector lens 30 may also be configured to distribute light in a second distribution pattern (e.g., FIG. 4) in which the light is emitted from the projection apparatus 10 above and below the horizon.

Figure 5:
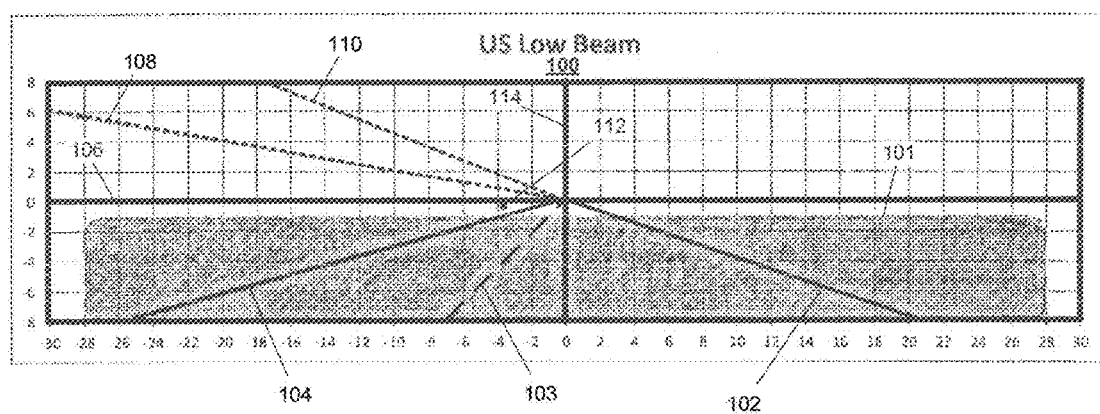
FIG. 5 illustrates a standard United States low beam light distribution.

The phrases "at and/or below the horizon" and "above and below the horizon" are defined with reference to FIG. 5 which illustrates a standard United States beam distribution 100 including a low beam light spread 101 and the following reference lines: road right edge 102; road center line 103; road left edge 104; horizon axis/line 106; on-coming driver's eye position in a car of standard height 108; on-coming driver's eye position in a truck or SUV of taller height 110; and vertical axis/line 114. In particular, the phrase "at and/or below the horizon" means light emitted from the projector lens 30 that is emitted at and/or below the horizontal line 106 (e.g., generally parallel to ground and/or downwardly from the projector apparatus 10 and towards the ground) while the phrase "above and below the horizon" means the light emitted from the projector lens 30 is emitted above and below the horizontal line 106.

Turning back to FIG. 2, lens 30 can be made of a plastics material such as PMMA. Lens 30 is a projector lens, having a light incident surface (facing light source 20) and an oppositely facing light exit surface which is convex, e.g. spherical. From the use of projector lens 30 and reflector 28 configured as an ellipsoidal reflector this type of headlamp 12 is referred to in the art as a PES (Projector Ellipsoidal System), with which shutter 22 is used.

For example, the projector lens 30 may comprise an aspheric or aspherical lens. According to one embodiment, the projector lens 30 may include an upper partial projector lens 40 and a lower partial projector lens 42. The upper and/or lower partial projector lenses 40, 42 may include, but is not limited to, known parabolic, elliptical and spheroelliptical configurations, conic sections (such as, but not limited to, paraboloids, hyperboloids, and ellipsoids) as well as higher-order aspherics. Higher-order aspherics mean surface departures from conic, which are proportional to $r^4$, $r^6$, $r^8$, $r^{10}$, and so on, where r is the radial distance from the optical axis.

Referring now to FIG. 3, the upper partial projector lens 40 may include a portion of an aspheric lens that has an optical axis O1 with its focus F1 on the upper edge 44 of the shutter 22. While not labelled for clarity, the lower partial projector lens 42 may also include a portion of an aspheric lens having an optical axis with its focus below the center of the primary light engine 20. The axis of the lower partial projector lens may be the cut plane for both the upper and lower partial projector lenses 40, 42. Both the upper and lower partial projector lenses 40, 42 may have the same focal lengths. This is merely one exemplary embodiment of the projector lens 30, and other configurations are within the scope of the present disclosure.

The specific arrangement, shape and contour of the reflector 28 and the projector 30 will depend on the specific application of the projector apparatus 12 and may include (but is not limited to) such factors as the overall size constraints on the projector apparatus 12, desired aesthetic appearance of the projector apparatus 12, as well as the desired light output of the projector apparatus 12. Projector lens 30 could also be a simple (rather than compound as in FIGS. 3-4) aspheric lens as known in Tessnow Pub. US 2009/0052200, incorporated by reference as if fully set forth herein, such that when a shutter 22 is in position between light engine 20 and lens 30, shutter 22 cuts off the upper portion of the visible beam creating a sharp cutoff and the low beam mode.

The shutter 22 includes an upper edge 44 that defines a cut-off edge. The upper edge 44 is located, as seen in the path of the light, near the focus of projector lens 30. The shutter 22 may be fixed. Alternatively, shutter 22 may be provided to selectively change the distribution pattern emitted by the projector apparatus 12. In either case, the upper edge 44 of the shutter 22 is used (either alone or in combination with the projector 30) to emit light at and/or below the horizon 106.

In an embodiment in which the shutter 22 is configured to selectively change the distribution pattern emitted by the projector apparatus 12, the shutter 22 may be configured to move between at least a first position (as generally illustrated in FIGS. 2 and 3) and a second position (as generally illustrated in FIG. 4). While the shutter 22 is shown in two different positions (FIGS. 3 and 4), it should be appreciated that the shutter 22 may also be configured to be positioned in other orientations (such as, but not limited to, any position intermediate the first and second positions).

The shutter 22 may be coupled to one or more actuator mechanisms 48. For the sake clarity, only a single shutter 22 and actuator mechanism 48 is shown; however, more than one shutter 22 and/or actuator mechanism 48 may be provided depending on the application. The actuator mechanism 48 may include any device for moving the shutter 22 between the first and second positions. For example, the actuator mechanism 48 may comprise a solenoid and/or motor coupled to the shutter 22 through associated gearing, levers, cams, linkages, pivot arms, or the like, for moving, rotating, and/or pivoting the shutter 22. The actuator mechanism 48 may move the shutter 22 upon receipt of a signal from the controller 16 (FIG. 1) as discussed herein. Alternatively, a user may directly control the actuator mechanism 48 to move the shutter 22. The shutter 22 may, for example, pivot about a pivot axis PA.

Turning now to FIG. 3, one embodiment of the projector apparatus 12 is illustrated in the low (e.g., regular) beam pattern/mode. In particular, the controller 16 (FIG. 1) may transmit one or more signals configured to energize the primary light engine 20 and emit light (e.g., illustrated schematically as light beams B1 and B2). For example, the controller 16 may transmit a signal to cause the power source 14 (also shown in FIG. 1) to provide the necessary electrical input to the primary light engine 20. The controller 16 may also transmit one or more signals to the shutter 22 to arrange the shutter 22 in a first position. As used herein, the phrase "first position" is intended to mean that at least a portion of the shutter 22 obscures a portion of the projector lens 30 from the light beams B1, B2 emitted from the primary light engine 20.

As discussed in more detail herein, the shutter 22 may be configured to obscure the projector lens 30 from the light beams B1, B2 emitted from the primary light engine 20 when in the first position such that the light emitted by projector apparatus 12 is distributed at and/or below the horizon. According to one embodiment consistent with the present disclosure, the shutter 22 may be configured to obscure at least a portion 50 of the upper partial projector lens 40 from the primary light source 20 when arranged in the first position. Optionally, the reflector 28 may also be configured to ensure that the light beams B1, B2 emitted from the primary light engine 20, and reflected therefrom, are obscured from the portion 50 of the projector lens 30 when the shutter 22 is in the first position.

Turning now to FIG. 4, the projector apparatus 12 is illustrated in an optional high beam pattern/mode. In particular, the controller 16 (FIG. 1) may transmit one or more signals configured to energize the primary light engine 20 and may transmit one or more signals to the shutter 22 to arrange the shutter 22 in a second position such that the projector apparatus 12 emits light from the projector lens 30 (e.g., illustrated schematically as light beams B3 and B4) both above and below the horizontal axis. For example, the controller 16 may transmit a signal to cause the power source 14 (also shown in FIG. 1) to provide the necessary electrical input to the primary light engine 20. As used herein, the phrase "second position" is intended to mean that the light (e.g., B3, B4) emitted from the primary light engine 20 may exit the projector lens 30 generally unobstructed by the shutter 22. For example, the light (e.g., B3, B4) emitted from the primary light engine 20 may exit both the upper and lower partial portions 40, 42 of the projector lens 30 when the shutter 22 is in the second position such that the light emitted projector apparatus 12 is distributed at and/or below the horizon. Thus, the shutter 22 generally does not obscure the projector lens 30 from the light beams B3, B4 emitted from the primary light engine 20. Again, it is worth noting that the shutter 22 may be arranged in other positions to define other light patterns. As such, the projector apparatus 12 is not limited to only the first and second positions and/or the low and high beam patterns. If projector apparatus 12 were for a dedicated high beam, shutter 22 can be omitted.

As discussed herein, headlamp performance ratings from NHTSA specify sharp gradient cutoffs, wide spreads, a maximum glare level to oncoming traffic, and minimum photometric intensity at certain test points in the beam. For example, with reference to FIG. 5, Table XIX-a of the NHSTA standard mandates, inter alia, a maximum light intensity of 12,000 candela for a test point 112 corresponding to 0.86 degrees down from the horizontal axis and 3.5 degrees left from the vertical axis (also referred to as the (0.86 D, 3.5 L) test point 112 or the NHSTA test point 112). The (0.86 D, 3.5 L) test point 112 is positioned in the low beam illumination region (e.g., below the horizon 106) and generally corresponds to the amount of glare experienced by incoming traffic. To perform well in the NHTSA rating system, the (0.86 D, 3.5 L) test point 112 should not exceed the maximum photometric intensity limit specified by the NHTSA rules (e.g., 12,000 candela). In the low beam, the two most critical test points for distance in the driver's lane are the (0.6 D, 1.3 R) point, corresponding to 0.6 degrees down from the horizontal axis and 1.3 degrees right from the vertical axis, which has a 10,000 candela minimum, and the (0.86 D, V) point, corresponding to 0.86 degrees down from the horizontal axis and on the vertical axis, which has a 4,500 candela minimum. In the high beam pattern (not shown), Table XVIII of the NHSTA standard mandates, inter alia, a minimum light intensity of 40,000 candela (and 75,000 cd maximum) for a test point corresponding to the intersection of the horizontal and vertical, i.e. 0 degrees from the horizontal axis and 0 degrees from the vertical axis (also referred to as the (H, V) test point). The (H, V) test point is most critical in the high beam.

Embodiments of Partially Coated Lamp Capsule

Figure 7:
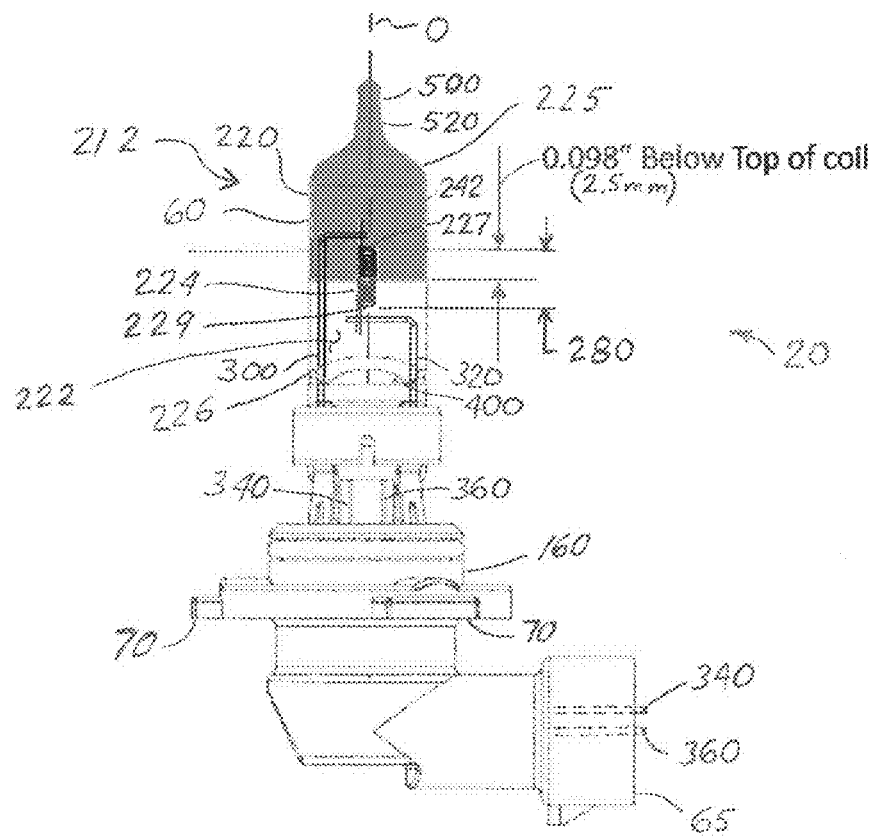
FIG. 7 is an elevational view depicting lamp capsule 212 in a first present embodiment showing coating 60 extending to 0.098 (2.5 mm) below top of filament coil 224.
Figure 8:
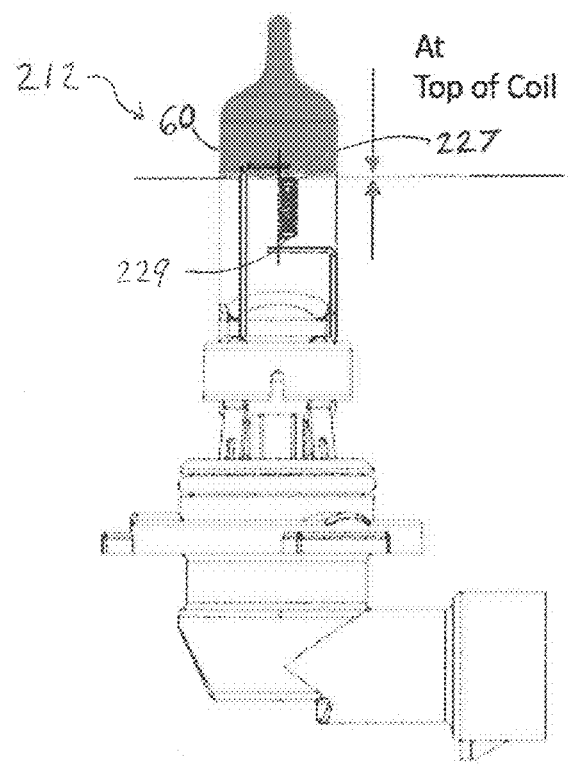
FIG. 8 is an elevational view depicting lamp capsule 212 in a second present embodiment showing coating 60 extending to at the top of filament coil 224.
Figure 9:
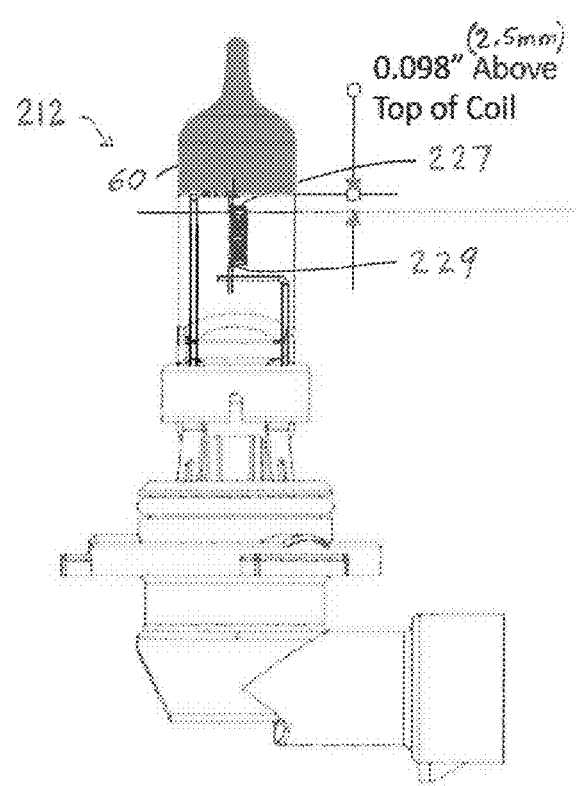
FIG. 9 is an elevational view depicting lamp capsule 212 in a third present embodiment showing coating 60 extending to 0.098 (2.5 mm) above top of filament coil 224.

Referring to FIGS. 7-9, the primary light engine 20 is suitably the partially coated automotive halogen headlamp capsule 212, shown in three embodiments therein. Lamp capsule 212 includes a lamp envelope 220 of a light-transmissive material, such as glass, which defines an enclosed volume 222. Lamp envelope 220 includes a generally tubular portion 242 having a generally central axis defining an optical axis O. Tubular portion 242 is closed at its upper region 225 by a tip-off portion, or dome, 500 and closed at the lower capsule base 226 by press seal 400. A filament 224 is mounted within lamp envelope 20. Typically filament 224 for a low beam is located on or near the central optical axis O of lamp capsule 212. Filament 224 has an axial extent 280 along optical axis O. Filament axial extent 280 can be referred to as filament length. Filament 224 has a top of coil at filament distal end 227, and a bottom of coil at filament proximal end 229. Filament axial extent 280 extends between top and bottom of filament 224, that is, between filament distal end 227 and filament proximal end 229. First and second external electrical leads 340, 360 extend through press seal 400 and make electrical contact, within press seal 400, to internal filament supports 300, 320 which provide mechanical support to and electrical connection to filament 224. FIGS. 8-9 are similar to FIG. 7 except for the axial extent of coating 60, discussed hereinbelow.

Lamp capsule 212 includes a lamp base 160 on which lamp envelope 220 is received. Lamp base 160 has, on an upper region thereof, a bulb-receiving region into which filament supports 300, 320 extend. Lamp base 160 has on a lower region thereof, readily see in FIG. 10 where leads 340, 360 are shown extending into and out of the page, a vehicle wiring connector-receiving region 65 that receives a vehicle wiring connector (which is coupled to a vehicle wiring harness) to make electrical contact to leads 340, 360. The upper capsule envelope 220-receiving region of base 160 may be generally transverse to its lower vehicle wiring connector-receiving region, such that overall lamp capsule 212 may be generally L-shaped. Embodiments of lamp capsule 212 may be constructed in accordance with specifications known in the art as SAE 9005 (EC HB3) or SAE 9006 (EC HB4) type capsule.

Figure 12A:
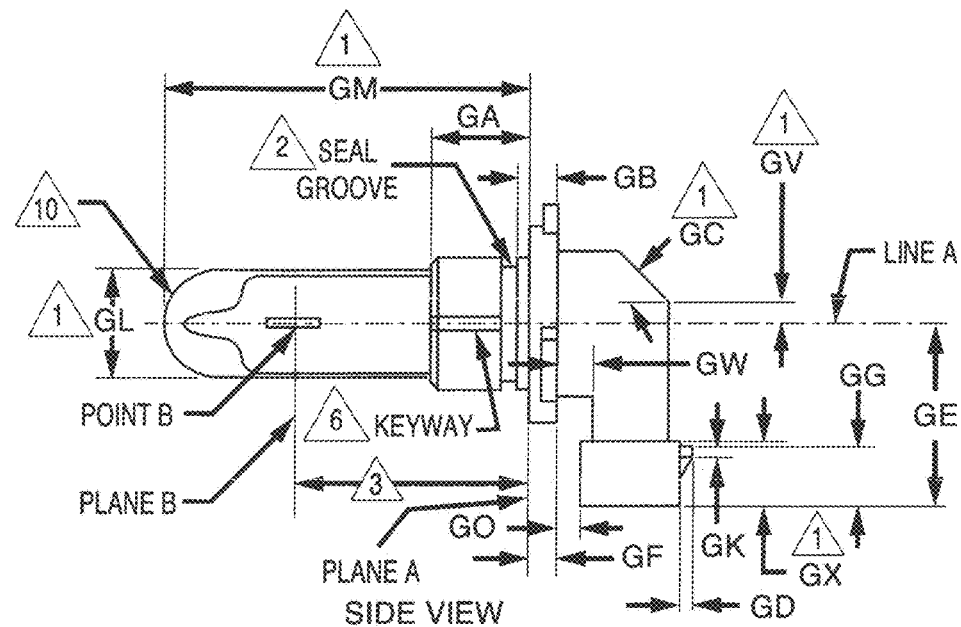
Figure 12A:
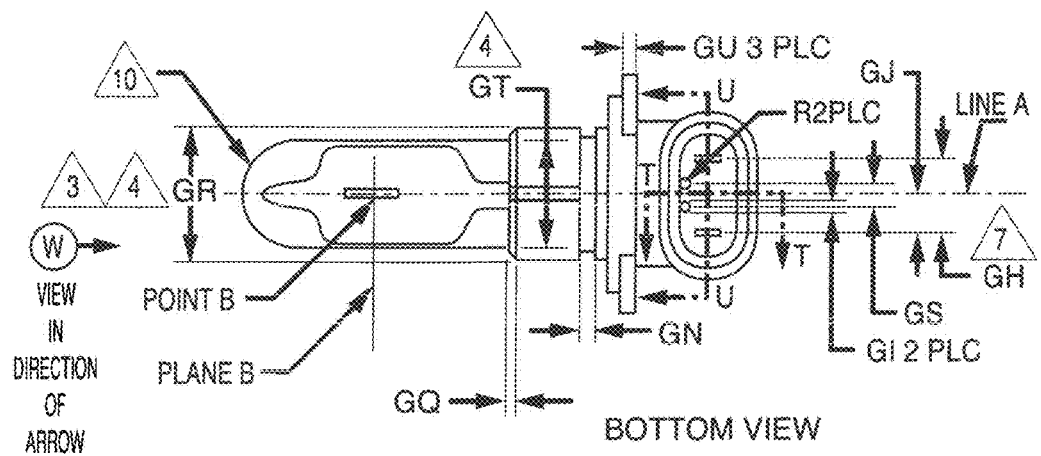

Referring to FIGS. 12A, 12B there is shown an excerpt from an SAE (Society of Automotive Engineers) technical specification. SAE Document J2560 at pages 41-56 (issued July 2007) is incorporated hereby in its entirety as if fully set forth herein. An excerpt shown in FIGS. 12A, 12B contains specifications of a 9005 bulb, depicting a suitable L-shaped headlamp base 160, which fits within the spatial envelope of bulbs designated as SAE-9005, SAE-9006, SAE-9145, SAE-9140, SAE-9155, SAE-9040, SAE-9045, SAE-9055, EC-HB3, EC-HB4, or EC-HB10.

Figure 10:
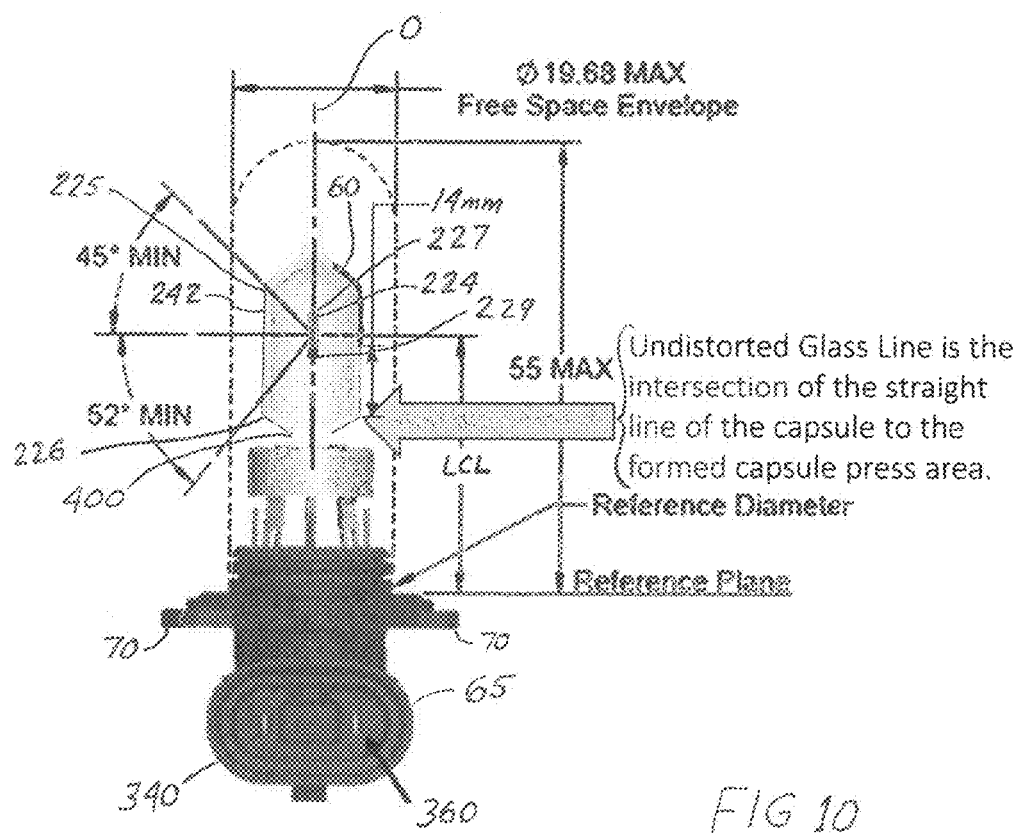
FIG. 10 illustrates lamp capsule 212 of the FIG. 7 embodiment and coating 60 with reference to the undistorted glass line.

Referring to FIGS. 7 and 10, headlamp base 160 includes locking tabs 70 to make connection to reflector 28, such as at mounting surface 34 (FIG. 6), as is known in the art by linear insertion followed by a turn of lamp capsule 212 about capsule axis O. Further details of lamp capsule retention, electrical connection, and lamp-to-reflector coupling structure are known in Applicants' assignee's U.S. Pat. No. 9,939,119 (Lessard), which as already mentioned is incorporated in its entirety as if fully set forth herein. Locking tabs 70 extend from lamp base 160 and may have the form of radially-extending tabs or projections, e.g. three such tabs 70 as shown. Locking tabs 70 are typically molded with lamp base 160 and are located at different circumferential positions around base 160. In a manner well-known in the art and not further illustrated here, reflector mounting surface 34 forms a socket having a ledge onto which capsule locking tabs 70 can be introduced through mating slots on mounting surface 34 such as by axial and subsequent slight rotational (so-called "eighth-turn" or "quarter-turn") motion akin to a bayonet latch, further details of which are known in Applicants' assignee's U.S. Pat. No. 10,066,801 (Rice), which as already mentioned is incorporated in its entirety as if fully set forth herein.

The lamp vessel or capsule has at its free distal end a dome 500 having a non-transparent coating 520. The dome coating 520 is a light-attenuating layer, such as black paint, that covers the outside surface of dome 500 and is opaque. The opaque cap or coating 520 prevents or substantially prevents the transmission of light through dome 500. For example, opaque coating 520 blocks at least 95% of incident light. The opaque coating 520 can optionally be colored, for example, gold, silver or blue. Opaque coating 520 is especially useful in a capsule designed for low-beam pattern usage since it prevents light being emitted through projector lens 30 that is not managed by reflector 28; opaque coating 520 can be omitted on a capsule designed for high-beam pattern use.

As shown in FIG. 7, filament 224 is arranged as a so-called axial coil headlight. The filament 224 has a filament distal portion 227 proximate to capsule upper region 225 and a filament proximal portion 229 located proximate to capsule base 226 and press seal 400. For the depicted FIG. 7 orientation of a filament length axially aligned with optical axis O, the filament's terminal ends define distal and proximal portions 227, 229, respectively.

Capsule 212 along its envelope 220 has a filter applied thereto in selective regions that alters the color temperature of the light issuing from capsule 212. An exemplary filter is a coating 60 applied to envelope 220. In regions where coating 60 is applied, it is preferably uniform circumferentially about capsule envelope 220. Suitable as coating 60 is the bluish absorption coating disclosed in U.S. Pat. No. 6,369,510 (Shaw). The bluish coating 60 is an absorption coating on the glass outer envelope that absorbs light at a peak of around 600 nm (the yellow-red region), and although the transmission of the bulb still results in a continuous output spectrum, it has a lower "yellow" content than uncoated halogen sources, see FIG. 6 of Shaw '510 Pat. Coating 60 thus absorbs more yellow, red and green wavelength light than it does blue and violet light. This results in the white light from a light source, such as filament 224, that passes through coating 60 being shifted to a higher color temperature and to appear more bluish. Lamp capsule 212 can be dip-coated as is known in Shaw Pat. '510, and then regions on lamp envelope 220 that have been coated but are to be uncoated in the finished capsule 212 have coating 60 removed locally by trimming in a defined manner by a laser, in a process known in the art. The amount of absorption achieved by coating 60 and the color temperature of the light passed therethrough can be controlled by the coating thickness as taught in Shaw Pat '510. If expedient, the region of capsule 212 at upper region 225 at dome 500 can be coated and, if opaque layer 520 is applied, opaque layer 520 can be applied over coating 60. In a lamp capsule 212 patterned for high beam use and opaque coating 520 were omitted (not shown), the coating 60 would be advantageously applied uniformly over entire capsule upper region 225 including the region that would have been occupied by the (omitted) opaque coating 520. If desired for manufacturing convenience or as a manufacturing artifact, press seal 400 can also be coated, but press seal 400 is not an optically active region, so a coating there is functionally irrelevant.

Optically active regions of capsule envelope 220 are those that pass light to reflector cup 32. Capsule 220 is typically made of glass to withstand high temperatures, and in the forming process filament 224 and halogen mixture fill gas is sealed by press seal 400. Light is not emitted from press seal 400; thus, press seal 400 is an optically inactive region of envelope 220. Furthermore, as is well-known in the art, press seal 400 is retained in a capsule mounting bracket at an upper region of lamp base 160 and concealed.

The capsule 212 of the present embodiments is devoid of a shade cup in the enclosed volume 222 internal of the capsule envelope 220, as such would be unnecessary since capsule 212 is suitable for use with a projection headlamp system which is equipped with shutter 22.

Referring to FIG. 10, on capsule envelope 220 adjacent capsule base 226 is a region referred to as the undistorted glass line, which is understood by one of ordinary skill in the art as the intersection of a straight line along outer surface of capsule envelope 220 with the formed area of capsule press seal 400. The region of capsule envelope 220 above the undistorted glass line is the optically active region of capsule envelope 220, and light passing through above the undistorted glass line is usable by reflector cup 32. The region of capsule envelope 220 below the undistorted glass line is optically not active, and the presence of any light-transmissive coating 60 below the undistorted glass line (which may be present for manufacturing convenience or as a processing artifact) is immaterial to measured photometry results, since any light that might pass through those regions would end up in the socket hole of mounting surface 34 and does not interact with useable reflector cup 32 surfaces.

Referring to FIG. 7 and FIG. 10, lamp capsule 212 has coating 60 (shown in fragmentary view in FIG. 10) that covers a region extending from capsule upper region 225 in a direction toward filament distal end 227 to an axial location below the top (filament distal end 227) of coil or filament 224, preferably to an axial location about, or at, 0.098 inch (2.5 mm) below filament distal end 227. The undistorted portion, i.e., optically active portion, of capsule envelope 220 below filament proximal end 229 is uncoated, that is, devoid of coating 60. More preferably, the entire remaining undistorted portion of capsule envelope 220 below a lowermost axial periphery of coating 60 is uncoated, as seen in FIG. 7. As mentioned above, if a portion of capsule envelope 220 that is optically inactive, such as press seal 400, had some coating 60 on it, that would be functionally immaterial. As seen, coating 60 does not extend as far towards lamp base 160 as to reach filament proximal end 229. Coating 60, when it axially overlies a portion of filament 224 as in FIG. 7, does not overlie the entire filament length 280, but rather only a portion thereof. As seen in axial direction, coating 60 is coincident with a substantial portion of filament axial extent 280, where substantial is understood as being 10% or more of filament axial extent 280. Coating 60 extends downward to about a middle of the length of filament axial extent 280, or just slightly more than midpoint of the length. Thus, in some embodiments coating 60 extends in axial direction coincident with a major portion (i.e., more than half) of filament axial length 280, leaving a minor portion (i.e., less than half) of filament axial extent 280 uncoated. FIG. 10 also shows that for a coating 60 extending to about, or at, 0.098 inch (2.5 mm) below filament distal end 227, in the SAE-9005 lamp capsule shown, that corresponds to coating 60 terminating at a location that is about, or at, 14 mm above the undistorted glass line (shown with double-headed arrow dimension line), or in effect an uncoated "window" having a height dimension of 14 mm above the undistorted glass line.

Referring to FIG. 8, another advantageous embodiment of lamp capsule 212 has coating 60 that covers a region extending from capsule upper region 225 in a direction toward filament distal end 227 to an axial location just at the top of filament 224, i.e. it extends just to filament distal end 227, also referred to as being even with distal end 227. The undistorted portion, i.e., optically active portion, of capsule envelope 220 below filament proximal end 229 is uncoated, that is, devoid of coating 60. More preferably, the entire remaining undistorted portion of capsule envelope 220 below a lowermost axial periphery of coating 60 is uncoated, as seen in FIG. 8. In particular in this embodiment, as seen radially outward from filament 224, regions on capsule envelope 220 that are axially coincident with filament 224 are uncoated. The distance corresponding to the FIG. 8 embodiment that would be seen in a view analogous to FIG. 10 is an uncoated "window" having a height of about 16 mm, or exactly 16 mm, above the undistorted glass line.

Referring to FIG. 9, another advantageous embodiment of lamp capsule 212 has coating 60 that covers a region extending from capsule upper region 225 in a direction toward filament distal end 227 that terminates at an axial location about, or at, 0.098 inch (2.5 mm) above filament distal end 227. The undistorted portion, i.e., optically active portion, of capsule envelope 220 below filament proximal end 229 is uncoated, that is, devoid of coating 60. More preferably, the entire remaining undistorted portion of capsule envelope 220 below a lowermost axial periphery of coating 60 is uncoated, as seen in FIG. 9. The distance corresponding to the FIG. 9 embodiment that would be seen in a view analogous to FIG. 10 would be an uncoated "window" having a height of about 18 mm, or exactly 18 mm, above the undistorted glass line.

Figure 11:
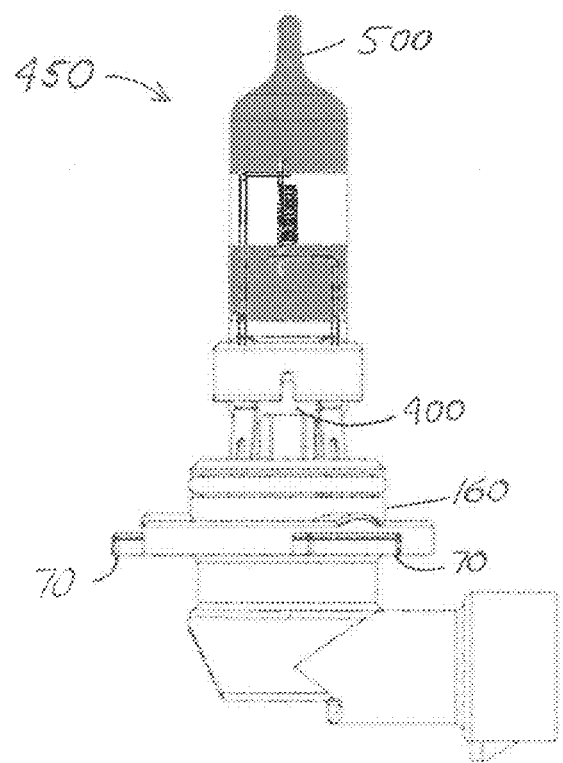
FIG. 11 is an elevational view of a Prior Art "Silverstar Ultra 9005" capsule with an uncoated band.
Figure 13:
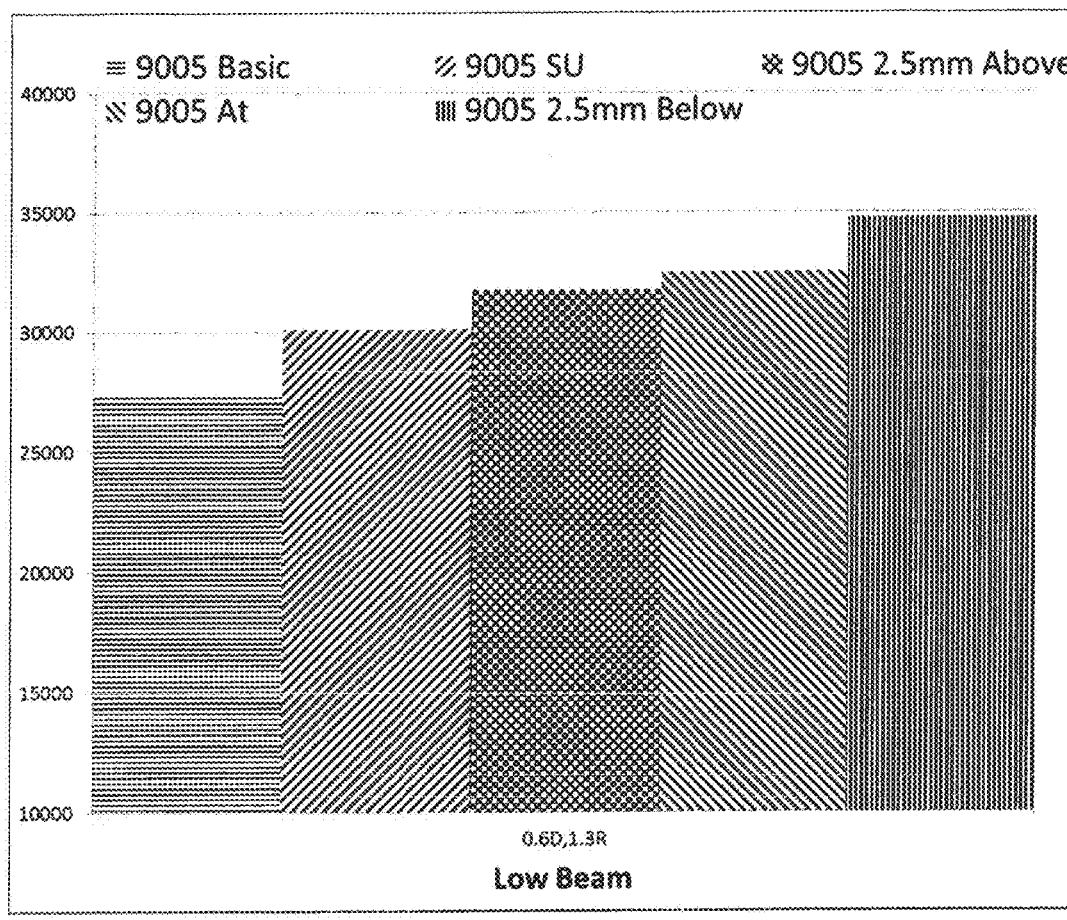
FIG. 13 depicts a comparative observation in a conventional production projector headlight at test point (0.6 D, 1.3 R) in the low beam of three present embodiments of FIGS. 7-9, a Silverstar Ultra "SU 9005" lamp of FIG. 11 and an uncoated "9005 Basic" lamp.
Figure 14:
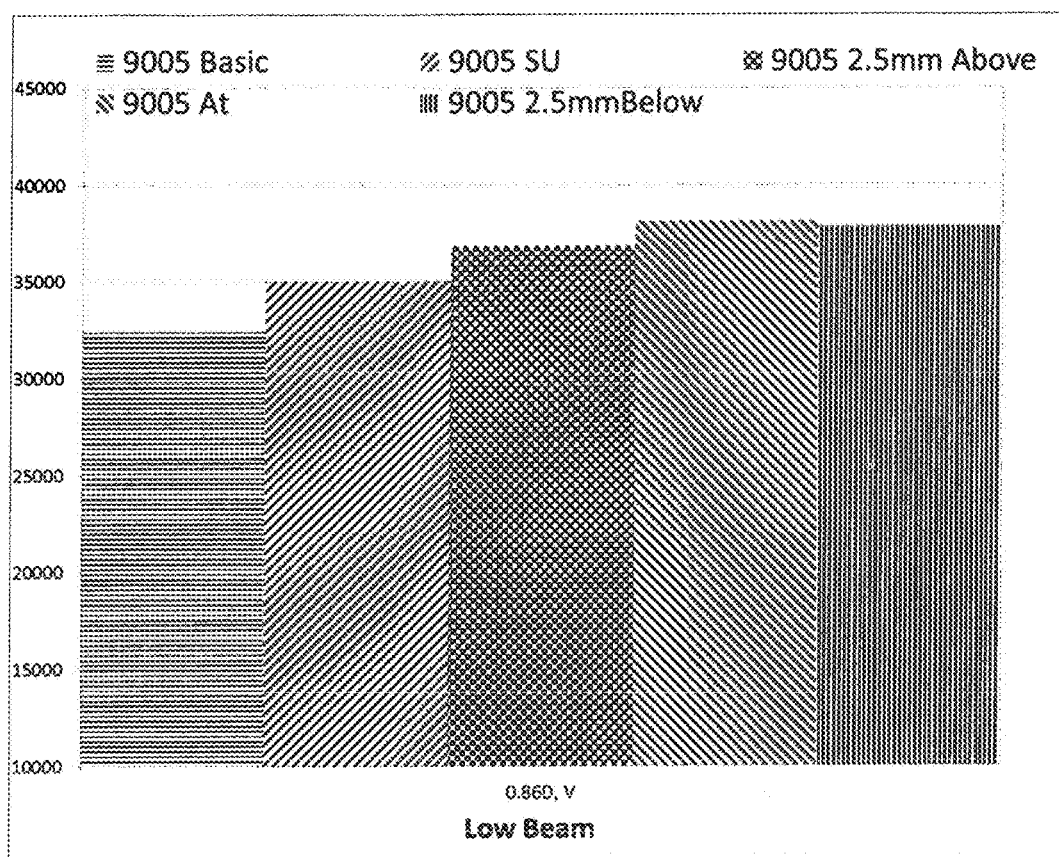
FIG. 14 depicts a comparative observation in a conventional production projector headlight at test point (0.86 D, V) in the low beam of three present embodiments of FIGS. 7-9, a Silverstar Ultra "SU 9005" lamp of FIG. 11 and an uncoated "9005 Basic" lamp.

Referring to FIGS. 13-14, empirical evaluations were made using a current production (Ford Taurus vehicle) projector-type headlight system with a lamp capsule 212 according to each of the present embodiments shown in FIGS. 7-9, and using a prior art Silverstar Ultra ("SU") 9005 lamp capsule 450 shown in FIG. 11 as well as a prior art standard uncoated 9005-type lamp referred to as "9005 Basic" for comparison. Such a "9005 Basic" lamp is similar to the Silverstar Ultra lamp 450 shown in FIG. 11 but without any coating, i.e. the "9005 Basic" lamp is referred to as an "uncoated bulb." Thus, five different lamp capsules were tested and results recorded, as shown in the intensity bar graphs, at various test points in the beam pattern, and FIGS. 13-14 graphically show two important test points in the low beam pattern, the (0.6 D, 1.3 R) and the (0.86 D, V) test points, respectively. Referring to the legend and looking at the bars from left to right in FIGS. 13-14, the "9005 Basic" lamp is indicated by horizontal line shading (leftmost bar); the FIG. 11 9005 Silverstar Ultra (SU) lamp 450 by forward slash shading; the FIG. 9 embodiment ("2.5 mm above") of lamp capsule 212 by cross-hatching; the FIG. 8 embodiment ("at") of lamp capsule 212 by backslash shading; and the FIG. 7 embodiment ("2.5 mm below") of lamp capsule 212 by vertical line shading. When all the five different capsules were operated in low beam mode, it was observed at test point 112, referred to as the (0.86 D, 3.5 L) point, that all five were within the 12,000 cd maximum light intensity to avoid glare. It was also observed that none of the lamp capsules according to present embodiments FIGS. 7-9 failed to meet an intensity requirement; i.e., they would produce street-legal low beam and high beam.

Advantageously and referring to empirical observations in low beam, it is seen that at the critical (0.6 D, 1.3 R) test point depicted in FIG. 13 which has a 10,000 candela minimum, and at the critical (0.86 D, V) test point depicted in FIG. 14 which has a 4,500 candela minimum, the present partially coated lamp capsule 212 embodiments of FIGS. 7-9 offer substantial improvements over both the "9005 uncoated Basic" lamp and "9005 Silverstar Ultra" lamp 450.

Further advantageously, when in high beam mode the comparison of the five different lamp capsules was conducted, it was observed that at the critical (H,V) high beam test point (not graphically shown) the present partially coated embodiments of FIGS. 7-9 gave intensity exceeding that of the prior art Silverstar Ultra and 9005 Basic uncoated lamps. In particular, the 9005 Basic lamp did not meet the 40,000 candela minimum intensity; the Silverstar Ultra lamp 450 gave about 44,000 candela; and the present partially coated embodiments of FIGS. 7-9 each gave about 48,000 candela. It is known that due to such factors as tolerance in the overall system and manufacturing variation, conventional halogen projector headlights often struggle to pass the (H,V) test point consistently; thus the present partially coated embodiments of FIGS. 7-9 each give a significant performance improvement over the Silverstar Ultra lamp 450, offering a buffer or margin over the 40,000 candela minimum.

In operation, on the reflector compatible with a conventional reflection system headlamp, the hot spot optics for casting light a far distance down the road are not located in the central part of the reflector. This is in contrast to the reflector used with a projection type headlamp as shown in FIG. 6. Thus, a Silverstar Ultra lamp capsule 450 when used with its intended reflection-system reflector, sends filtered light (emitted through the coating below the filament) to the center and rear portion of the reflector, and since the filament corresponds to an axially uncoated region, then unfiltered light tends to be sent to the spread optics. Using the Silverstar Ultra lamp 450 in a projection-type reflector 32 causes too much filtered light to be sent to the central, hot-spot forming heel 37 or projection reflector 32, detrimental to performance. Coating configurations of the present embodiments herein avoid this disadvantage and offer an improved balance of performance in high beam and low beam use in a projector system.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, are understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

An abstract is submitted herewith. It is pointed out that this abstract is being provided to comply with the rule requiring an abstract that will allow examiners and other searchers to quickly ascertain the general subject matter of the technical disclosure. It is submitted with the understanding that it will not be used to interpret or limit the scope or meaning of the claims, as set forth in the rules of the U.S. Patent and Trademark Office.

The following, non-limiting list collects reference numerals used in the specification.
10 lighting system
12 projector apparatus
14 power source
16 controller
18 housing
20 primary light engine
22 shutter
24 heat management
27 ballast circuits
28 reflector
30 projector lens
32 reflector cup
34 opening/mounting surface
36 open end
37 heel region of reflector
38 interior surface
40 upper partial projector lens
42 lower partial projector lens
44 upper edge
48 actuator mechanism
50 portion
60 light-transmissive coating
65 wiring connector-receiving region
70 locking tabs
100 standard United States beam distribution
101 low beam light spread
102 road right edge
103 road center line
104 road left edge
106 horizon axis/line
108 on-coming driver's eye position in a car of standard height
110 on-coming driver's eye position in a truck or SUV of taller height
112 (0.86 D, 3.5 L) test point
114 vertical axis/line
160 lamp base
212 lamp capsule
220 lamp envelope
222 enclosed volume
224 filament
225 capsule upper region
226 capsule base
227 filament distal portion
229 filament proximal portion
242 tubular portion
280 filament extent
300, 320 filament supports
340, 360 external electrical leads
400 press seal
450 "Silverstar Ultra" 9005 lamp capsule
500 dome
520 opaque coating
B1-B4 light beams
O optical axis of lamp capsule 212
O1 optical axis of lens
F1 focal point
LCL Light Center Length

What is claimed is:

1. An automotive vehicle projector headlamp (12) comprising:
    a primary light engine (20) comprising a partially coated lamp capsule (212);
    a reflector (28) configured to reflect visible light emitted from the lamp capsule (212);
    a projector lens (30) configured to project at least a portion of said reflected visible light from said reflector (28); and wherein
    the coated lamp capsule (212) comprises:
    a capsule envelope (220) having an upper region (225), a lower capsule base (226), and defining a longitudinal optical axis (O);
    a filament (224) mounted within the capsule envelope (220) for emitting light when energized by electrical energy, said filament (224) mechanically supported by and electrically coupled to filament supports (300, 320) located within said capsule (212) and electrically connected to leads (340, 360) extending from said capsule base (226);
    the filament (224) having a filament axial extent (280) along said capsule optical axis (O), the filament (224) defining a filament distal end (227) proximate the capsule upper region (225) and a filament proximal end (229) located proximate the capsule base (226), the filament axial extent (280) extending between the filament distal end (227) and the filament proximal end (229);
    the capsule envelope (220) having a light-transmissive coating (60) uniformly covering the capsule upper region (225), the coating (60) extending circumferentially about the capsule envelope (220) in a direction of the lower capsule base (226) to an axial location adjacent the filament distal end (227); and
    the capsule envelope (220) being devoid of the coating (60) at optically active regions of the capsule envelope (220) adjacent the lower capsule base (226).

2. The projector headlamp of claim 1, wherein the capsule envelope (220) is uncoated at axial locations on the capsule envelope (220) below the filament proximal end (229).

3. The projector headlamp of claim 1, wherein the capsule envelope (220) is uncoated on an undistorted portion of the capsule envelope (220) below the filament proximal end (229).

4. The projector headlamp of claim 1, wherein the coating (60) extends to an axial location in a region defined between about 0.098 inch (2.5 mm) above the filament distal end (227) and about 0.098 inch (2.5 mm) below the filament distal end (227).

5. The projector headlamp of claim 4, wherein the coating (60) extends to the axial location about 0.098 inch (2.5 mm) above the filament distal end (227).

6. The projector headlamp of claim 4, wherein the coating (60) extends to the axial location coincident with the filament distal end (227).

7. The projector headlamp of claim 4, wherein the coating (60) extends to the axial location about 0.098 inch (2.5 mm) below the filament distal end (227).

8. The projector headlamp of claim 1, wherein
the capsule envelope (220) is coated with the coating (60) in the region extending to a location, as seen along the optical axis (O), axially above the filament proximal end (229);
the coating (60) being coincident, in an axial direction, with a portion less than an entire portion of the filament axial extent (280).

9. The projector headlamp of claim 1, wherein the coating is coincident with a substantial portion of the filament axial extent (280).

10. The projector headlamp of claim 1, wherein the coating (60), in the axial direction, is coincident with a major portion of the filament axial extent (280), and a portion of the capsule envelope (220) coincident with a minor portion of the filament axial extent (280) is uncoated.

11. The projector headlamp of claim 1, wherein the reflector (28) comprises a heel region (37) disposed at a centrally located rearward region thereon that generates a hot spot in the light beam projected from the projector lens (30).

12. The projector headlamp of claim 1, further comprising a shutter (22) disposed at a first position between said primary light engine (20) and said projector lens (30), said shutter (22) being non-transparent and comprising an upper edge (44) defining a cut-off whereby said shutter (22) is configured to selectively obscure a portion of said projector lens (30) from said reflected visible light and to selectively emit at least a portion of said reflected visible light through at least a portion of said projector lens (30) in a first low-beam light distribution pattern when disposed in said first position.

13. A partially coated vehicle halogen lamp capsule (212), comprising
a capsule envelope (220) having an upper region (225), a lower capsule base (226), and defining a longitudinal optical axis (O);
a filament (224) mounted within the capsule envelope (220) for emitting light when energized by electrical energy, said filament (224) mechanically supported by and electrically coupled to filament supports (300, 320) located within said capsule (212) and electrically connected to leads (340, 360) extending from said capsule base (226);
the filament (224) having a filament axial extent (280) along said capsule optical axis (O), the filament (224) defining a filament distal end (227) proximate the capsule upper region (225) and a filament proximal end (229) located proximate the capsule base (226), the filament axial extent (280) extending between the filament distal end (227) and the filament proximal end (229);
the capsule envelope (220) being coated with a light-transmissive coating (60) covering a region extending from the capsule upper region (225) in a direction of the filament distal end (227) to an axial location in a region defined between about 0.098 inch (2.5 mm) above the filament distal end (227) and about 0.098 inch (2.5 mm) below the filament distal end (227);
the capsule envelope (220) being devoid of the coating (60) on an undistorted portion of the capsule envelope (220) below the filament proximal end (229).

14. The lamp capsule of claim 13, wherein the coating (60) extends to the axial location about 0.098 inch (2.5 mm) above the filament distal end (227).

15. The lamp capsule of claim 13, wherein the coating (60) extends to the axial location coincident with the filament distal end (227).

16. The lamp capsule of claim 13, wherein the coating (60) extends to the axial location about 0.098 inch (2.5 mm) below the filament distal end (227).

17. The lamp capsule of claim 13, wherein
the capsule envelope (220) is coated with the coating (60) in the region extending to a location, as seen along the optical axis (O), axially above the filament proximal end (229);
the coating (60) being coincident, in an axial direction, with a portion less than an entire portion of the filament axial extent (280).

18. The lamp capsule of claim 13, wherein the coating is coincident with a substantial portion of the filament axial extent (280).

19. The lamp capsule of claim 13, wherein the coating is uniform circumferentially about the capsule envelope (220).

20. The lamp capsule of claim 13, wherein the coating (60), in the axial direction, is coincident with a major portion of the filament axial extent (280), and a portion of the capsule envelope (220) coincident with a minor portion of the filament axial extent (280) is uncoated.

21. The lamp capsule of claim 13, wherein the undistorted portion of the capsule envelope (220), at locations on the capsule envelope (220) below the axial peripheral extent of the coating (60), is uncoated.

22. The lamp capsule of claim 13, wherein a length dimension of the filament (24) is parallel the capsule optical axis (O).

23. The lamp capsule of claim 13, wherein the coating (60) is an absorption coating.

24. The lamp capsule of claim 13 wherein the coating (60) is a blue transmissive coating that preferentially transmits blue wavelength light.

25. The lamp capsule of claim 13, wherein the coating (60) is a blue transmissive coating that preferentially absorbs light in the red wavelength range.

26. The lamp capsule of claim 13, wherein the coating (60) is an absorption coating that absorbs yellow, red and green light more than blue and violet light.

27. The lamp capsule of claim 13, wherein the coating (60) shifts a color temperature of white light transmitted therethrough to a higher color temperature.

28. The lamp capsule of claim 13, wherein the capsule upper region (225) comprises an opaque cap (520).

29. The lamp capsule of claim 28, wherein the coating (60) is contiguous with a lower edge of the opaque cap (520).

30. The lamp capsule of claim 13, further comprising a lamp base (160) having a vehicle wiring connector-receiving region (65) and a plurality of locking tabs (70) extending radially from the lamp base (160) configured to latch into corresponding slots formed in a mounting surface (34) of a projection system reflector (28).

31. The lamp capsule of claim 13, wherein dimensions of the lamp capsule (212) conform to specifications of a lamp chosen from the group of lamps consisting of the types SAE-9005 (EC-HB3) and SAE-9006 (EC-HB4).

* * * * *